Sept. 8, 1936.  J. LEGENDRE  2,053,618
AGRICULTURAL IMPLEMENT
Filed Aug. 5, 1935  3 Sheets-Sheet 1

Inventor
JULIEN LEGENDRE
By
Attorney

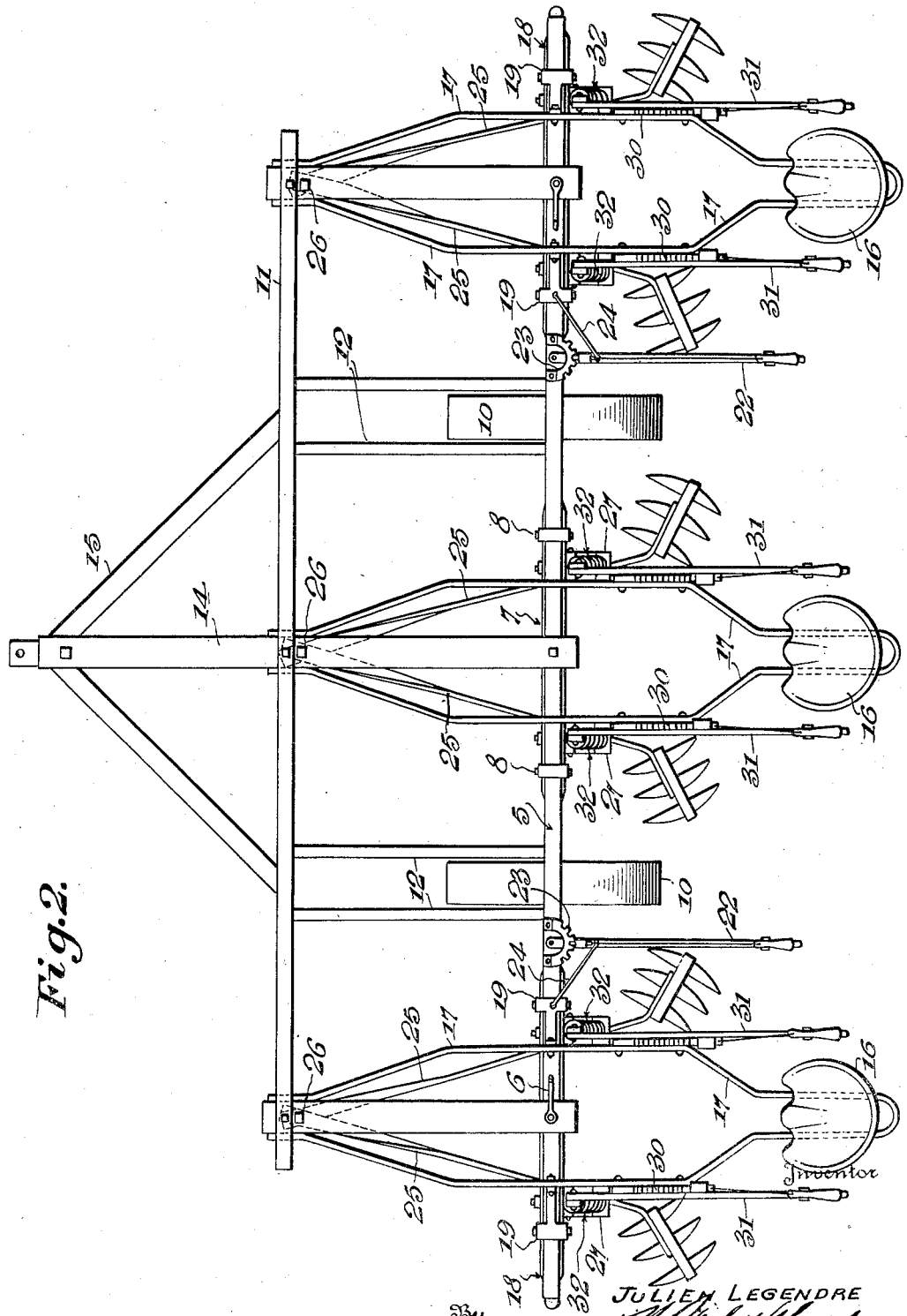

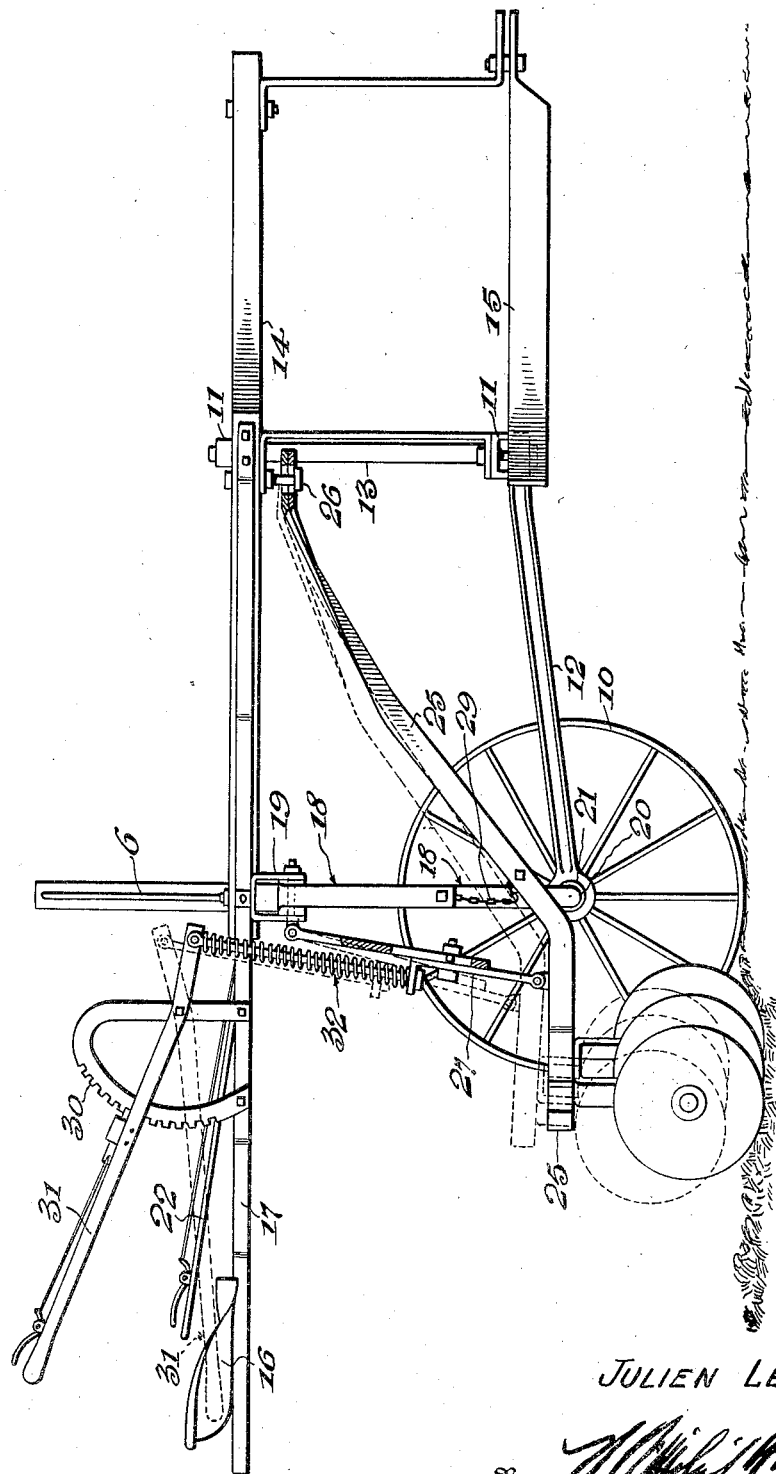

Patented Sept. 8, 1936

2,053,618

UNITED STATES PATENT OFFICE 2,053,618

AGRICULTURAL IMPLEMENT

Julien Legendre, Thibodaux, La.

Application August 5, 1935, Serial No. 34,808

7 Claims. (Cl. 97—152)

The invention relates generally to agricultural implements and primarily seeks to provide a novel form of cultivator or like implement in which provision is made for simultaneously working three rows or hills and in which is included novel means for adjusting the spaced relation of the ground working tools.

In its more detailed nature the invention resides in the provision of a novel frame structure supported upon a pair of wheels disposed in spaced relation centrally of and spaced a considerable distance inwardly from the ends of the frame, three sets of row working tools, one set centered on a line passing centrally between the wheels and one set centered on a line disposed laterally-outwardly of each wheel, and means for individually-adjustably supporting each laterally-outwardly disposed set to enable adjustment of the relative elevation and the spacing of the sets.

Another object of the invention is to provide a structure of the character described wherein is included three seats which may be simultaneously occupied by operators of the implement, and tool set adjustment controls conveniently operable from said seats.

Other objects will in part be obvious and in part be pointed out hereinafter.

To the attainment of the aforesaid objects and ends, the invention further resides in the novel details of construction, combination and arrangement of parts, all of which will be first fully described in the following detailed description, then be particularly pointed out in the appended claims, reference being had to the accompanying drawings, in which:

Figure 2 is a plan view.

Figure 3 is an end view, vertical adjustment of one set of tools being indicated in dotted lines.

Figure 1:
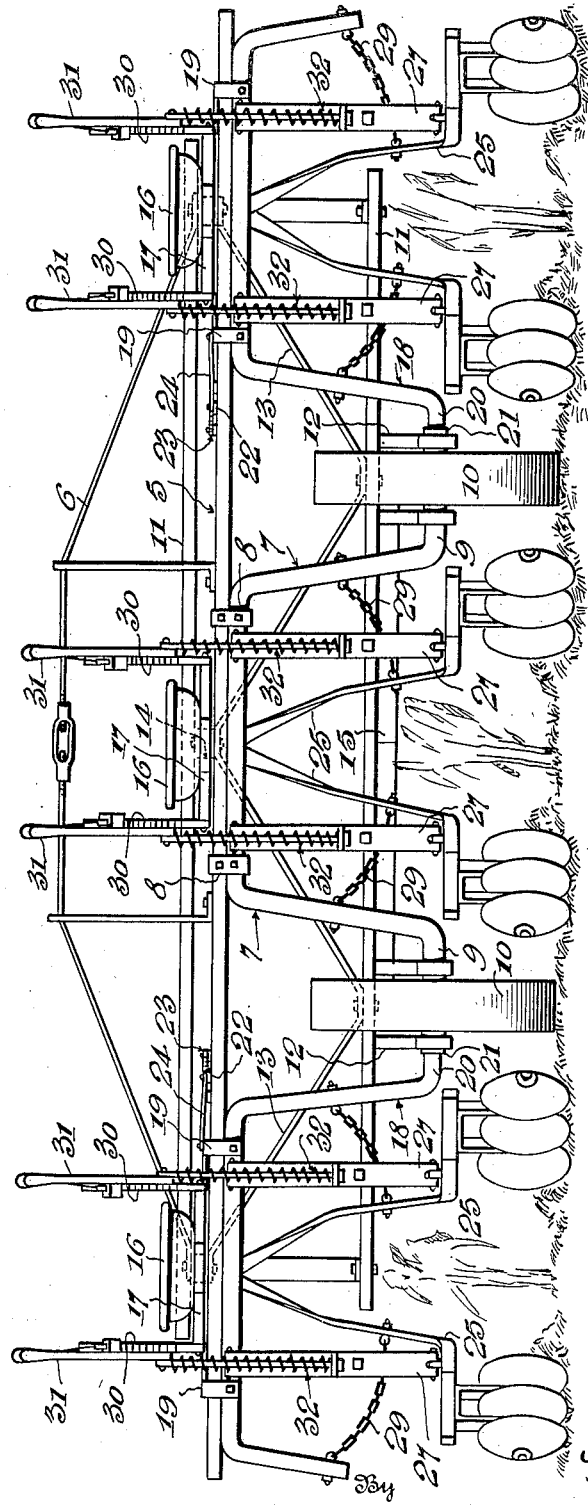
Figure 1 is a rear elevation illustrating the invention.
Figure 4:
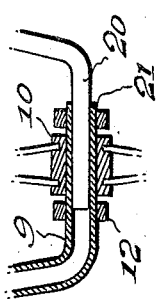
Figure 4 is a detail section illustrating the slide connection between one of the wheel shaft portions and its associated shifter frame extension.

In the drawings, in which like numerals of reference indicate like parts in all of the figures, 5 designates a main frame cross beam which may be strengthened by a truss 6 if desired.

An inverted U-shaped wheel frame 7 is rigidly secured as at 8 beneath the central portion of the cross beam 5. The member 7 depends from the frame beam and is provided at its lower end with outwardly directed hollow wheel shaft portions 9 on which frame supporting wheels 10 are rotatably mounted, see Figure 1.

Upper and lower auxiliary frame beams 11 are carried in parallel relation to and in advance of the main beam 5 by forward directed reach arms 12, the auxiliary frame thus formed being suitably braced as at 13. The auxiliary frame includes a central draft beam 14 and a draft frame portion 15 through the medium of which my improved implement may be suitably connected with a tractor or other draft means.

Three seats 16 are provided for accommodating operators of the implement and are supported on suitably secured frames 17 carried by the implement framing, one on a line passing centrally between the wheels 10, and one on a line passing laterally-outwardly of each wheel 10, as illustrated in Figures 1 and 2 of the drawings.

It will be observed by reference to Figures 1 and 2 of the drawings that the main frame beam 5 extends a considerable distance laterally beyond each wheel 10 and on each laterally extended portion of this beam an inverted U-shaped shifter frame 18 is slidably carried through the medium of slide collars 19. The inner leg of each frame 18 is inwardly extended as at 20 and has a slide support bearing as at 21 in the adjacent wheel bearing shaft portion of the frame 7. This extension mounting permits free lateral sliding movement of the shifter frames 18 and materially strengthens the frames against twisting tendencies.

A rack segment 22 is secured upon the implement frame adjacent each of the laterally disposed operator seats and the slide frames 18 associated therewith and a pivoted lever and pawl equipment 23 link-connected as at 24 to one of the slide collars 19 of the respective frame 18 serves in the capacity of a control device whereby the operators may laterally shift and thereby vary the spaced relation of the frames 18.

It will be observed by reference to Figures 1 and 2 of the drawings that three sets of ground or row working tools are carried by the implement, one such set being disposed generally in line with each of the operator's seats hereinbefore referred to. In this particular disclosure I have illustrated cultivator disc sets, but it is to be understood that any other form of ground working tools may be employed such as harrows, plows or the like. As shown in the figures referred to, a group of tools at each side of the row line comprises a single set of tools and each such group of tools is suitably supported in the relation stated on a carrier member 25, two such members being provided for supporting each set of tools. The members 25 converge forwardly upwardly and are pivotally connected to the implement frame as at 26. See Figure 3.

Other carrier members 27 cooperate with the members 25 in the mounting of the tool groups, one such member 27 being connected with each group of a set of tools and with the respective shifter frame 18. The carrier members 25 and 27 by which each set of ground working tools is supported are flexibly mounted so as to permit vertical adjustment of the tool sets with respect to the ground. Chains 29 or other flexible connections enable limited freedom of the carrier members.

A pair of rack segments 30 are supported by the implement frame, one at each side of each operator's seat and a shifter lever and pawl equipment 31 cooperates with each of the segments 30 and is connected with one of the carrier members 27 through the medium of a spring plunger connection 32. By manipulation of the individual levers 31, the tool groups of each set of tools may be individually-vertically adjusted, and by employment of the lever equipment 23 one or the other, or both, of the shifter frames may be moved for the purpose of varying the spacing between the three sets of ground working tools.

In the foregoing description I have disclosed a simple ground working implement by employment of which three rows may be cultivated simultaneously, means being provided for adjusting the positions of the ground working tools to accommodate the implement to variations in the spacing of the rows, adjustments being made without the necessity of the operators in charge of the implement moving from their seats.

It will be observed that the wheels 10 are disposed between the rows so that they in nowise interfere with the ground working function or the adjustment of the spacing of the tool units. Positioned as they are the wheels can follow in the track of the hauling tractor and by reason of this positioning of the wheels and the equipment for elevation of the tool sets from the ground it is possible for the implement to be drawn over narrow bridges or along any path which may be taken by the hauling tractor.

It will be obvious also that by reason of the adjustments described the tool sets or units may be collectively or selectively used and that any desirable variation in the positions of the sets or units or the tool group of the respective units may be effected. The provision of the spring plunger link connections 32 enables a degree of free movement of the individual tool groups upon contact with ground obstructions.

What I claim is:

1. A three row cultivator comprising a pair of supporting wheels, a frame supported upon the wheels and extending a considerable distance laterally of each wheel, three sets of row working tools supported by the frame and disposed one set centered on a line passing centrally between the wheels, and one set centered on a line disposed laterally-outwardly of each wheel, and means for each set of tools for adjusting the same separately and independently vertically and means for each set of tools for adjusting the same separately and independently laterally.

2. A three row cultivator comprising a pair of supporting wheels, a frame supported upon the wheels and extending a considerable distance laterally of each wheel, three sets of row working tools supported by the frame and disposed one set centered on a line passing centrally between the wheels, and one set centered on a line disposed laterally-outwardly of each wheel, an operator's seat supported by the frame in association with each tool set, and control devices associated with and convenient to the outer seats for effecting lateral adjustments of the respective outer tool sets relative to each other and to the central tool set.

3. A three row cultivator comprising a pair of supporting wheels, a frame supported upon the wheels and extending a considerable distance laterally of each wheel, three sets of row working tools supported by the frame and disposed one set centered on a line passing centrally between the wheels, and one set centered on a line disposed laterally-outwardly of each wheel, an operator's seat supported by the frame in association with each tool set, and control devices associated with and convenient to each seat for selectively effecting vertical adjustments of each tool set and control devices associated with and connected to the outer seats for laterally adjusting the position of either outer tool set relative to the central tool set.

4. A three row cultivator comprising a pair of supporting wheels, a frame supported upon the wheels and extending a considerable distance laterally of each wheel, a set of row working tools supported by the frame centered on a line passing centrally between the wheels, a supporting frame member laterally-slidably supported on each laterally extended frame portion, a set of row working tools centered on a line disposed laterally-outwardly of each wheel and movable with the frame members thereadjacent, an operator's seat associated with each tool set, and means associated with and convenient to each laterally disposed seat for effecting lateral adjustments of the adjacent member.

5. In an implement of the character described, a transverse main frame bar, an inverted U-shaped member rigidly secured to and depending from the central portion of the bar and including outwardly extended bearing shaft portions, a pair of wheels supported on the shaft portions, an inverted U-shaped member laterally-slidably supported on and depending from the bar laterally of each wheel, a set of row working tools disposed centrally of the rigidly secured U-shaped member, a set of row working tools disposed centrally of and movable with each laterally-slidably supported U-shaped member, and means for adjusting the positions of the last named U-shaped members.

6. In an implement of the character described, a transverse main frame bar, an inverted U-shaped member rigidly secured to and depending from the central portion of the bar and including outwardly extended bearing shaft portions, a pair of wheels supported on the shaft portions, an inverted U-shaped member laterally-slidably supported on and depending from the bar laterally of each wheel, a set of row working tools disposed centrally of the rigidly secured U-shaped member, a set of row working tools disposed centrally of and movable with each laterally-slidably supported U-shaped member, means for adjusting the positions of the last named U-shaped members, each said laterally-slidably supported member including an inwardly extended portion having slide support on said rigidly secured member.

7. In an implement of the character described, an upper level sub-frame and a lower level sub-frame supported upon inverted U-shaped axles in the rear, said frames being connected in the front by vertical bracing members, one located in the front and one intermediate the axle and the front, a central frame and a pair of outer tool frames connected to the upper level sub-frame adjacent the intermediate vertical braces, said tool frames extending diagonally downward and rearwardly and having ground working tools connected thereto, means for vertically adjusting said tools and means for laterally adjusting either outer tool set toward and from the central set and a draft connection at the front of the lower level sub-frame.

JULIEN LEGENDRE.